United States Patent [19]

Pinson

[11] Patent Number: 4,498,032
[45] Date of Patent: Feb. 5, 1985

[54] HIGH TORQUE DIGITAL STEPPING MOTOR AND CONTROL

[75] Inventor: George T. Pinson, Huntsville, Ala.

[73] Assignee: The Boeing Company, Seattle, Wash.

[21] Appl. No.: 397,605

[22] Filed: Jul. 12, 1982

[51] Int. Cl.³ .............................................. H02K 37/00
[52] U.S. Cl. ...................................... 318/37; 310/24; 310/49 R; 310/35
[58] Field of Search ....................... 310/23, 24, 34, 35, 310/49; 318/37, 38, 119, 118

[56] References Cited

U.S. PATENT DOCUMENTS

| | | | |
|---|---|---|---|
| 676,305 | 6/1901 | Davis . | |
| 1,436,245 | 11/1922 | Geisler . | |
| 1,886,040 | 11/1932 | Moodyman . | |
| 2,056,719 | 10/1936 | Gelnaw | 172/126 |
| 2,617,949 | 11/1952 | Leland | 310/20 |
| 2,706,259 | 4/1955 | White | 310/22 |
| 2,851,619 | 9/1958 | Jones | 310/24 |
| 2,900,961 | 8/1959 | Sung | 121/38 |
| 3,075,504 | 1/1963 | Vogel | 121/121 |
| 3,097,278 | 7/1963 | Alderman | 300/49 X |
| 3,217,192 | 11/1965 | Feightner | 310/49 |
| 3,328,656 | 6/1967 | Dotson | 318/37 |
| 3,424,059 | 1/1969 | Conner et al. | 91/176 |
| 3,473,400 | 10/1969 | Firth et al. | 91/176 |
| 3,599,536 | 8/1971 | Myers | 91/480 |
| 3,661,059 | 5/1972 | Hunter et al. | 91/499 |
| 3,676,719 | 7/1972 | Pecci | 310/24 |
| 3,696,680 | 10/1972 | Deming et al. | 310/49 |
| 3,796,525 | 3/1974 | Kilmer | 418/61 |
| 3,848,515 | 11/1974 | Gardineer et al. | 91/184 |
| 4,012,675 | 3/1977 | Schulze, Jr. | 318/37 |
| 4,066,002 | 1/1978 | Eastman | 91/36 |
| 4,068,560 | 1/1978 | Orloff et al. | 91/36 |

FOREIGN PATENT DOCUMENTS 1348026 11/1963 France .................................. 310/24
961339 6/1964 United Kingdom .

Primary Examiner—Donovan F. Duggan
Attorney, Agent, or Firm—Delbert J. Barnard

[57] ABSTRACT

Three radially extending push rods (26, 28, 30) make contact with an undulating cam surface on the periphery of a cam (10). The push rods (26, 28, 30) are driven inwardly by electrical solenoids (94, 96, 98) or fluid motors (106, 108, 110). At the end of each step, one of the push rods (26, 28, 30) is fully extended and in contact with the bottom of a valley region of the cam surface. The second push rod is in a partially extended position against a sloping surface between a peak and a valley. The third push rod is in a partially extended position against an oppositely sloping surface between a peak and a valley. The push rods (26, 28, 30) are located within the center plane of a relatively thin cam. In other installations, they are spaced axially apart or both circumferentially and axially apart. A cam surface twists (FIG. 7) as it extends axially to, in that manner, provide different cam positions under each of three axially spaced apart push rods. A plurality of cams are connected together. Plural cams (172, 174, 176) with the same number of lobes are staggered in position. Or, the number of lobes can differ from cam to cam (FIGS. 10-14), to provide a variety of step size possibilities.

19 Claims, 15 Drawing Figures

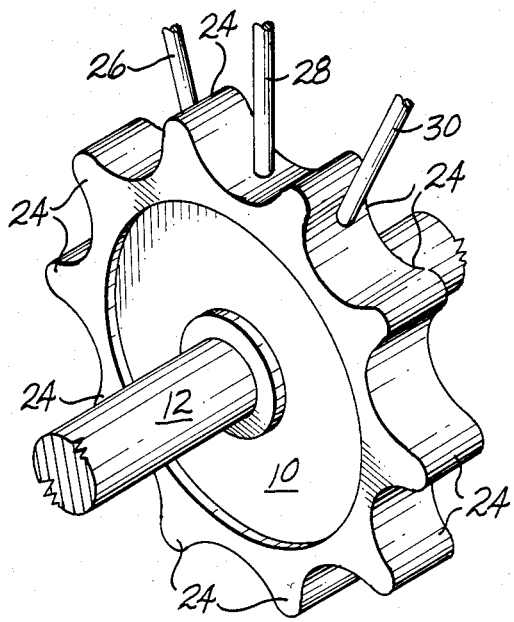
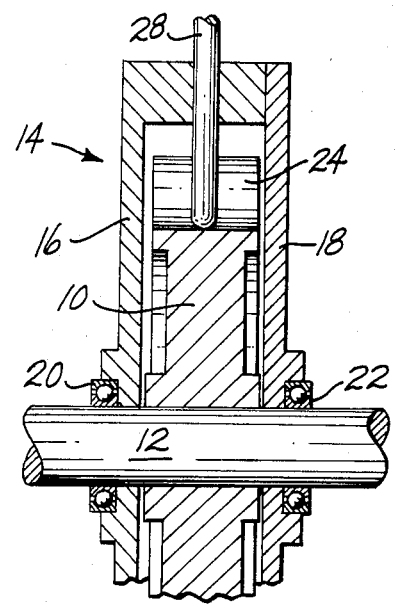
Fig. 1
Fig. 2
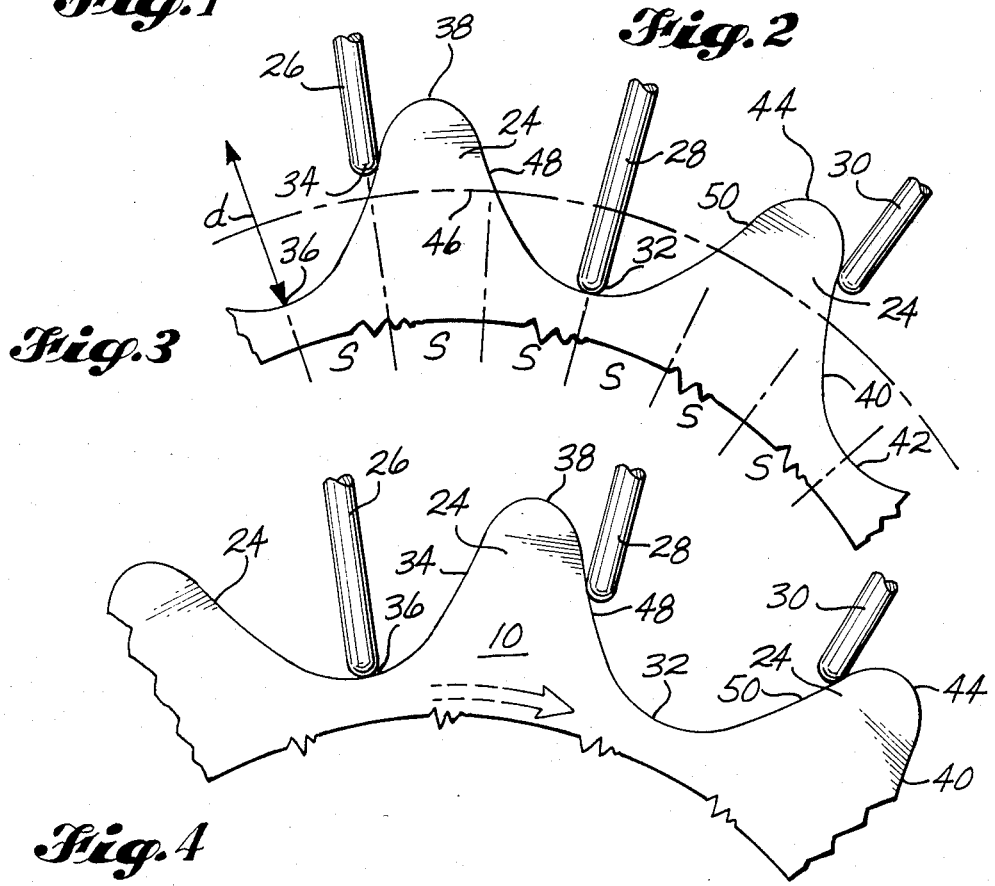
Fig. 3
Fig. 4

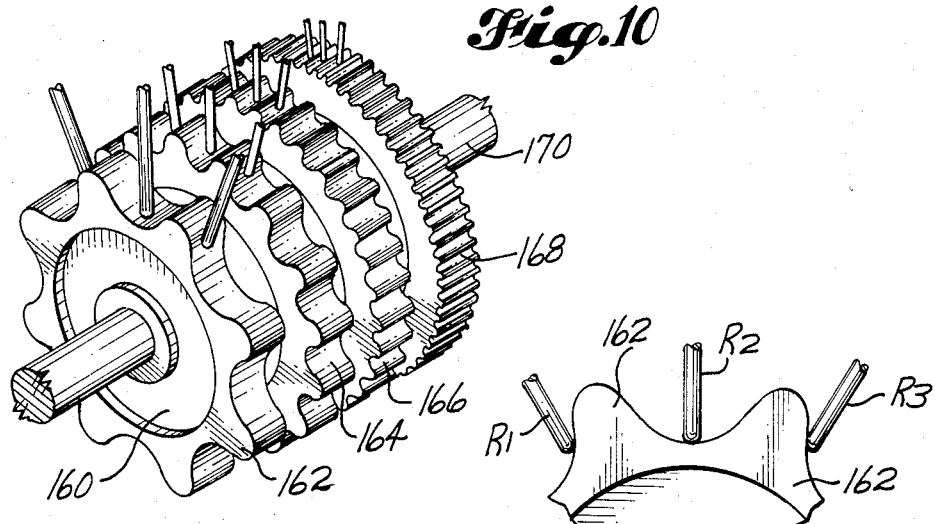
Fig.10
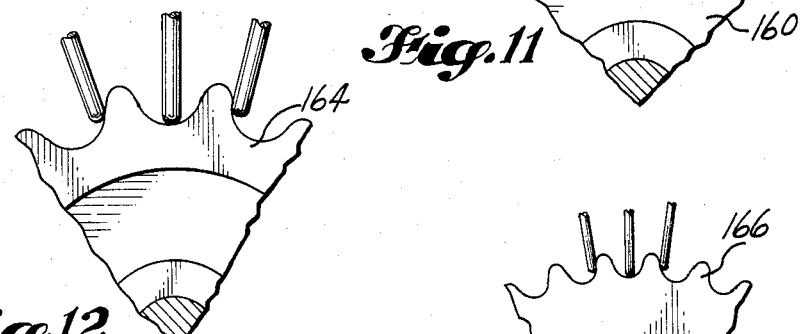
Fig.11
Fig.12
Fig.13
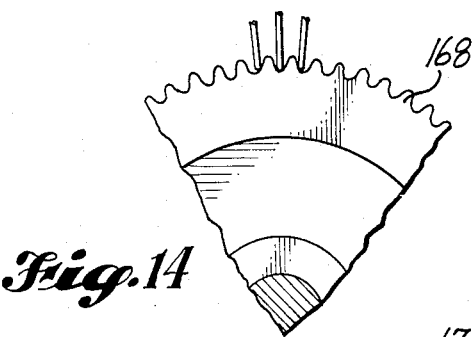
Fig.14
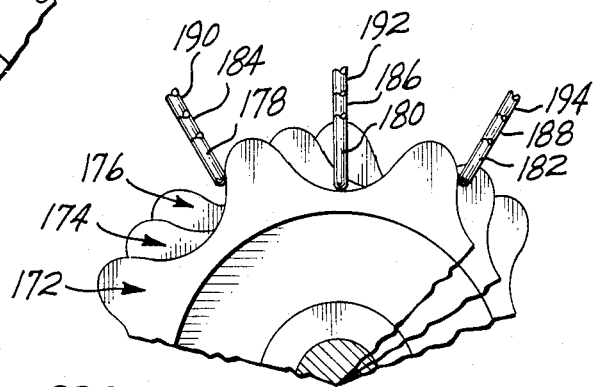
Fig.15

HIGH TORQUE DIGITAL STEPPING MOTOR AND CONTROL

TECHNICAL FIELD

This invention relates to the provision of a high torque stepping motor that is directly operable by digital command signals.

BACKGROUND ART

A major advantage of a digital system is that a discreet command issued to a digital reacting device results in a single discreet motion without the use of secondary measurements and feedback loops. A number of rotational action devices are in current use. They include low torque electrical motors, medium torque device such as geared electrical motors, high torque pneumatic motors and very high torque hydraulic devices. With the exception of electrical stepping motors, all of these action devices require feedback systems to determine the motor shaft position, compare the actual position to the required position and through a feedback loop generate new commands to change the motor shaft position until the desired position is reached. When high torques are required, there is currently no satisfactory alternative to the use of analog devices. The torque of an electrical stepping motor torque can be increased by the use of various gear drivers. However, this approach is not suitable for usages in which a torque of several hundred inch pounds are required, or wherein rapid response at a high torque is required.

Various known or proposed drive systems present in the patent literature, which should be considered for the purpose of putting the present invention into proper perspective relative to the prior art, are shown by the following U.S. Pat. Nos.: No. 676,305, granted June 11, 1901 to Albert G. Davis; No. 1,436,245, granted Nov. 21, 1922 to Kurt M. Geisler; No. 1,886,040, granted Nov. 1, 1932, to Edwin F. Moodyman; No. 2,056,719, granted Oct. 6, 1936, to John F. Gelnaw; No. 2,617,949, granted Nov. 11, 1952, to George H. Leland; No. 2,706,259, granted Apr. 12, 1955, to Walter H. Wight; No. 2,851,619, granted Sept. 9, 1958, to Walter A. Jones; No. 2,900,961, granted Aug. 25, 1959, to Chien-Bor Sung; No. 3,075,504, granted Jan. 29, 1963, to Richard Vogel; No. 3,328,656, granted June 27, 1967 to Gene M. Dotson; No. 3,424,059, granted Jan. 28, 1969, to Ci Conner et al; No. 3,473,440, granted Oct. 21, 1969, to Donald Firth et al; No. 3,599,536, granted Aug. 17, 1971, to Lester L. Meyers; No. 3,661,059, granted May 9, 1972, to John M. Hunter et al; No. 3,676,719, granted July 11, 1972, to Angelo A. Pecci; No. 3,796,525, granted Mar. 12, 1974, to John B. Kilmer; No. 3,848,515, granted Nov. 19, 1974, to Bayard G. Gardineer et al; No. 4,012,675, granted Mar. 15, 1977, to Everett E. Schulze, Jr.; No. 4,066,002, granted Jan. 3, 1978, to James M. Eastland; and No. 4,068,560, granted Jan. 17, 1978, to George Orloff et al. Also to be considered, is British No. 961,339, granted June 17, 1964, to Donald Firth et al.

DESCRIPTION OF THE INVENTION

A digital command stepping motor constructed according to the present invention is basically characterized by a cam mounted for rotation about an axis. The cam includes a circular peripheral portion presenting a radially outwardly directed, smoothly undulating cam surface, defined by alternating peak and valley regions. A set of three linear actuators is disposed radially outwardly from the cam surface. Each actuator comprises a radially extending push rod having an end portion in contact with the cam surface, means for forcibly driving its push rod endwise against said cam surface, and means for removing the drive force from its push rod. The actuators are spaced relative to the cam surface such that when the push rod of any one actuator is fully extended and is in contact with the bottom of a valley region, the push rod of the second actuator is in a partially extended position against a sloping surface between a peak and a valley, and the push rod of the third actuator is in a partially extended position against an oppositely sloping surface between a peak and a valley. Owing to this arrangement the cam wheel can be rotated a step in position in either direction, by operating the actuators to drive the push rod which is in contact with the sloping surface which trails the direction of desired rotation while removing any radially inwardly directed force on the push rods of the other two actuators.

In accordance with an important aspect of the invention, the cam is mounted on a drive shaft for rotation about the axis of rotation of the drive shaft and the push rods of all three linear actuators are located within the center plane of the cam. This permits construction of a stepping motor which is relatively short or thin in the axial direction. Also, it results in the applied force always being in the plane of the cam, and an equal distribution of radial reaction forces on the drive shaft bearings.

Another important aspect of the present invention is the provision of a high torque stepping motor in which a driving force need only be applied to a single actuator within a set of actuators to cause the moving element to move. The moving element is provided with a smoothly undulating cam surface against which the push rods of the actuators bear. During movement, all forces are removed from the actuators which are not applying a driving force and the push rods of such actuators are repositioned by movement of the cam surface.

Other aspects of the invention include combining together a plurality of cam surfaces on a single rotor element, and/or the provision of a plurality of sets of actuators on a cam surface, spaced axially and/or circumferentially apart.

Yet another aspect of the invention is to provide a digital stepping motor having a cam surface defined by circumferentially undulating peaks and valleys which twist as they extend axially, for the placement of different sections of the wave curve under the members of a set of actuators which are spaced apart axially but not circumferentially.

The basic principles of the present invention can be applied to a cam which is only a section of a wheel and which rotates back and forth within an arc of travel that is less than 360 degrees. Also, basic principles of the invention can be utilized in connection with certain linear actuators in which the cam surface is generated along an edge surface of a linear member.

These and other objects, features, advantages and characteristics of my invention will be apparent from the following detailed description of typical embodiments of the invention in which reference is made to the accompanying drawings.

BRIEF DESCRIPTION OF THE DRAWINGS

In the drawings, like reference numerals denote corresponding parts throughout the several views, and:

FIG. 1 is an isometric view of a ten lobe cam wheel and the push rods of a set of three actuators which are provided for driving the cam wheel in a step-by-step manner about the axis of rotation of the cam wheel;

FIG. 2 is an axial sectional view of an embodiment of a stepping motor of the type shown by FIG. 1, including a housing for the cam wheel;

FIG. 3 is an enlarged scale fragmentary side elevational view of the cam wheel shown in FIGS. 1 and 2, taken in the vicinity of the push rods and showing the cam wheel in a first position;

FIG. 4 is a view like FIG. 3, but showing the cam wheel advanced in position one step;

FIG. 10 is a view like FIG. 1, but of a four wheel embodiment, in which each wheel has a different number of lobes;

FIG. 11 is a fragmentary view of the first wheel shown in FIG. 10, and a set of three push rods;

FIG. 12 is a view like FIG. 11, but of the second wheel;

FIG. 13 is a view like FIGS. 11 and 12, but of the third wheel;

FIG. 14 is a view like FIGS. 11–13 but of the fourth wheel; and

FIG. 15 is a view similar to FIG. 11, but showing foreground and background wheels which are identical in construction but differ in position from each other about the axis of rotation.

DESCRIPTION OF THE PREFERRED EMBODIMENT

Figure 5:
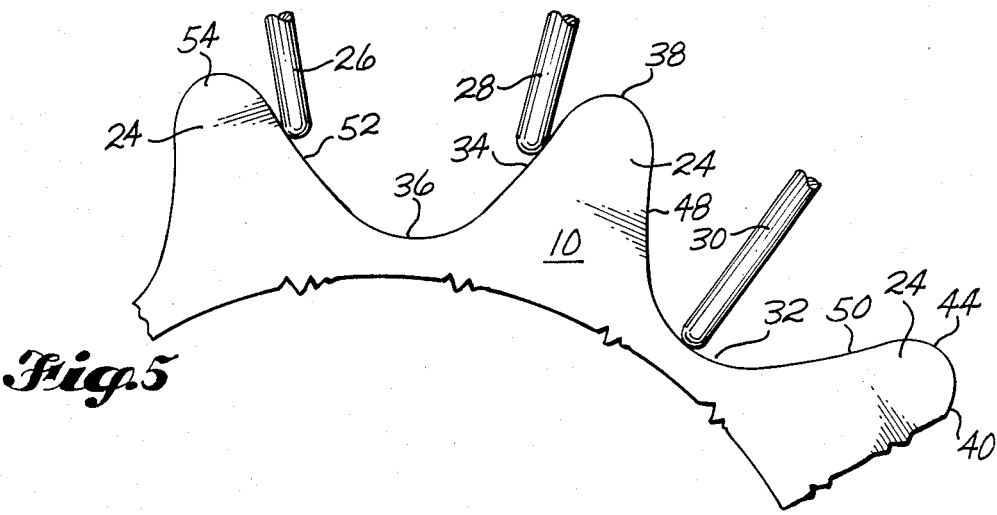
FIG. 5 is a view like FIGS. 3 and 4, showing the cam wheel advanced in position an additional step.

FIG. 1 shows a ten lobe cam wheel 10 that is mounted for rotation on a shaft 12 which is secured to the wheel 10 and rotates with it. The wheel 10 may be housed within a relatively narrow housing 14 (FIG. 2) having sidewalls 16, 18 which are closely adjacent the two sides of the wheel 10. In this embodiment, the drive shaft 12 is journaled for rotation by a pair of bearings 20, 22 carried by hub portions of the housing sidewalls 16, 18.

By way of typical and therefore non-limitive example, cam wheel 10 has ten lobes 24, together defining a radially outwardly directed cam surface which undulates smoothly and is characterized by rounded peaks and rounded valley regions between the peaks which are wider than the peaks.

The embodiment of FIGS. 1 and 2 comprises three circumferentially spaced apart linear actuators, each having a radially directed push rod 26, 28, 30. In this embodiment, push rods 26, 28, 30 are all situated within the same radial plane and such plane is the center plane of the cam wheel 10 (FIG. 2).

FIGS. 3–5 show the relative positioning of the push rods 26, 28, 30 to each other and to the various surface portions of the cam surface, circumferentially of the cam wheel 10. In FIG. 3, push rod 28 is shown in contact with the lowest point of a particular valley region 32. Push rod 26 makes contact with the sloping side surface 34 which extends between valley 36, to the left of valley 32 as pictured, and peak 38 between valleys 32, 36. Push rod 30 makes contact with the sloping surface 40 that is between valley 42, to the right of valley 32 as pictured, and the peak 44 between valleys 32, 42. The rounded ends of push rods 26, 30 make contact with the sloping surfaces 34, 40 at points which, in the radial direction, are somewhat less than halfway between the tips of the peaks and the bottoms of the valleys.

As shown, the cam surface undulates similar to a sine wave. As shown in FIG. 3, the center-to-center spacing of the valley regions is equal to three steps s of rotation of the cam wheel 10. The center-to-center spacing of the peaks is also equal to three steps s of rotation of the cam wheel 10. However, the valley regions are twice as wide as the peaks along the circle 46 which is positioned halfway between the tips of the peaks and the bottoms of the valleys. Stated another way, the valley width along circle 46 is equal to two steps of rotation of the cam wheel 10 and the peak width is equal to one step of rotation of the cam wheel 10.

Comparing FIGS. 3 and 4, if it is desired to drive the cam wheel 10 a single rotational step, in the direction shown by the arrow, the actuators are operated to exert a radially inwardly directed force on push rod 26 while removing any such force on the push rods 28, 30. This causes push rod 26 to move radially inwardly. As it moves, it exerts a force against the sloping surface 34 between valley region 36 and peak 38 on the side of peak 38 which trails the direction of desired rotation. The force applied by push rod 26 on the sloping surface 34 causes the cam wheel 10 to rotate until the inner end of push rod 26 makes contact with the bottom most point of recess 36. Relative movement of the cam surface below the push rods 28, 30 causes push rod 28 to rise in position from the bottom of recess 32 up to a position on the sloping surface 48 between the bottom of recess 32 and the top of peak 38. Push rod 30 rides over the top of peak 44 to a point of contact with the sloping surface 50 between the bottom of recess 32 and the top of peak 44. Removal of any inwardly directed force on the push rods 28, 30 frees them to make their position changes in response to the influence of the change in position of the cam surface below them which occurs when the cam wheel 10 is driven one rotational step by extension of the push rod 26. The end of the step of rotation is shown by FIG. 4.

Referring now to FIGS. 4 and 5, when it is desired to rotate the rotor 10 an addition step in the same direction, the actuators are operated to apply a radially inwardly directed force on push rod 30 and to remove any such force on the push rods 26, 28. As it moves inwardly, push rod 30 applies rotating force or torque on cam wheel 10, causing it to rotate until push rod 30 reaches the position shown by FIG. 5. The movement of the cam surface causes push rod 28 to first rise and pass over peak 38 and then take a drive ready position on sloping surface 34. Push rod 26 rises in position from the bottom of valley 36 up to a drive ready position on sloping surface between such valley 36 and the top of peak 54. As long as the radially inwardly directed force is maintained on push rod 30, it will remain in forceable contact with the bottom most point of valley 32, resulting in the cam wheel 10 being locked in position until the next drive pulse is applied.

In the embodiment of FIG. 2, the push rods 26, 28, 30 are all located within the same radial plane and this plane coincides with the center plane of the cam wheel 10. Thus, in this embodiment the applied force on the cam wheel 10 by a push rod 26, 28, 30 is always laterally centered between the two sides of the wheel 10 and is evenly distributed to the two bearings which support the drive shaft 12, minimizing binding and wear on the shaft bearings 20, 22.

The thin cam wheel design shown by FIGS. 1 and 2 makes possible the construction of a high torque stepping motor which can be used in installations which require, or can only accommodate, thin flat enclosures.

The drive shaft 12 is connected to a load, such as a rotatable surface portion of an aircraft, for example. A device incorporating the features shown by FIGS. 1-5 can be used to move the load in either a clockwise or counterclockwise direction, at a speed under the control of the user. The operation of the actuators to apply a driving force on one of the push rods 26, 28, 30 while removing any such force from the other two push rods 26, 28, 30, controls the direction of rotation. The type of actuator drive and its perimeters control the torque. The control of speed and direction of rotation can be placed under the control of a microprocessor, as will hereinafter be described in greater detail.

A comparison of FIGS. 3, 4 and 5 will show that, in each position, there is always a push rod in a lock position at the bottom of a valley, a second push rod in contact with a sloping surface between the bottom of a valley and the top of an adjoining peak, and a third push rod in contact with an oppositely sloping surface between the bottom of another valley and the top of an adjoining peak. Accordingly, at the end of each step of movement, the device is ready to be moved another full step in either direction, depending upon the next drive command which it receives.

Figure 6:
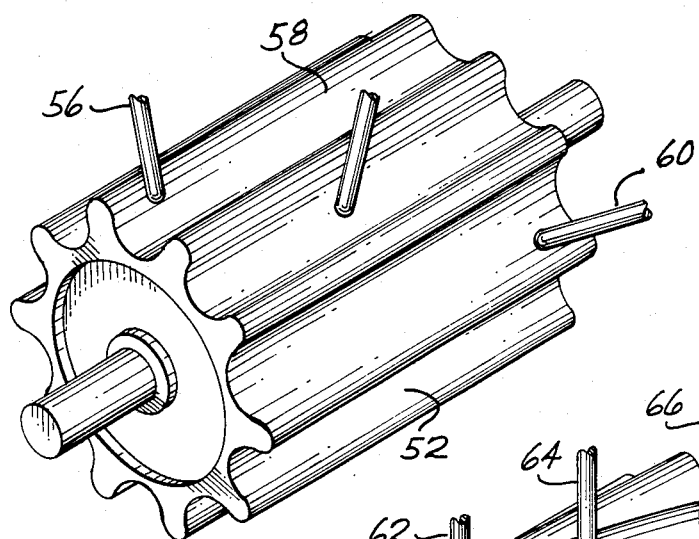
FIG. 6 is a view like FIG. 1, but of a modified embodiment, in which the cam wheel is wider and the push rods are spaced apart both axially and radially.

Referring now to FIG. 6, relating to a second embodiment, the rotor 52 in this embodiment is elongated and the push rodes 56, 58, 60 are spaced apart both circumferentially and axially. This arrangement may be utilized in an installation in which additional sets of three actuators are provided for applying additional torque to the cam wheel 52.

Figure 7:
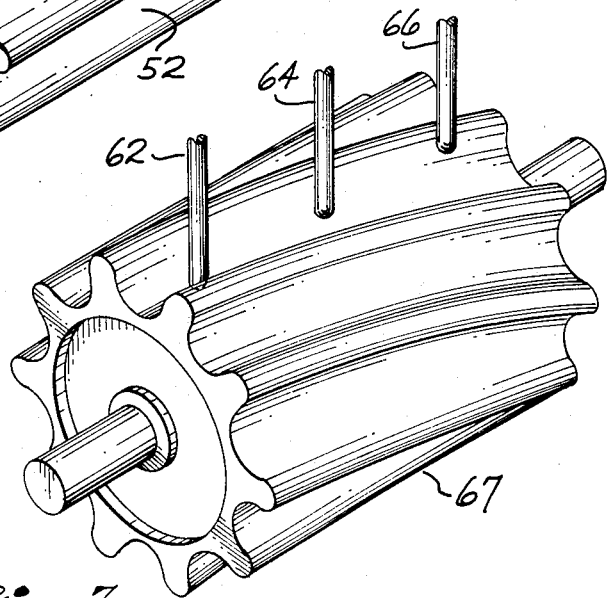
FIG. 7 is a view like FIGS. 1 and 6, but of another embodiment in which the actuators are spaced apart axially and the peaks and valleys follow helical paths as they extend axially of the cam wheel.

In the embodiment shown by FIG. 7, the three push rods 62, 64, 66 are shown to be spaced apart only in the axial direction, i.e. they are all located within the same axial plane but within different radial planes. In this embodiment, the same relationship of push rod position to cam surface region that has been described above in connection with FIGS. 3, 4 and 5 is established by twisting the peaks and valleys of the cam lobes on rotor 67, so that they will follow along helical paths as they extend in the axial direction.

The torque applying push rods can be driven by any suitable force generating mechanism, such as an electrical solenoid, a gas fluid motor or a hydraulic fluid motor, for example.

Figure 8:
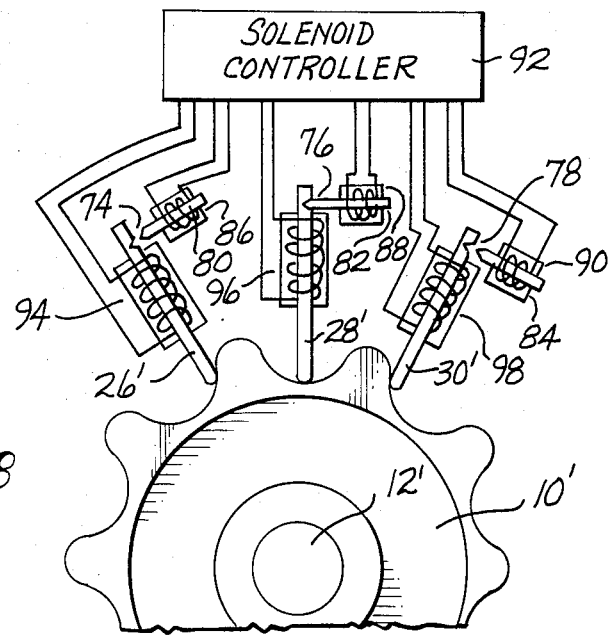
FIG. 8 is an end elevational view of an embodiment comprising electric solenoid type actuators and a block diagram control circuit.

FIG. 8 shows the embodiment of FIGS. 1-5 in combination with electrical solenoid motors 68, 70, 72 for driving the push rods. Electrical solenoids are quite well known mechanisms and for this reason they are only schematically shown in this figure. The sequencing of the solenoids can be easily established by a simple illustrated by a block diagram labeled "controller and drive circuit".

According to an aspect of the invention, each push rod 26', 28', 30' may be constructed to include a lock notch 74, 76, 78 for receiving a lock pin 80, 82, 84. A solenoid 86, 88, 90 or the like may be used for moving the locking pin into and out from engagement with the lock notch. In use, the controller 92 operates to energize solenoid 96 for driving push rod 28'. At the same time, it issues a command to operate solenoid 88 for moving the lock pin 82 into the lock notch 76, so as to lock the push rod 28' in its extended position. Electrical energy can be removed from the solenoid 96 and the push rod 28' will remain in a fully extended position, locking the cam wheel against rotation until the next drive command is sent.

Figure 9:
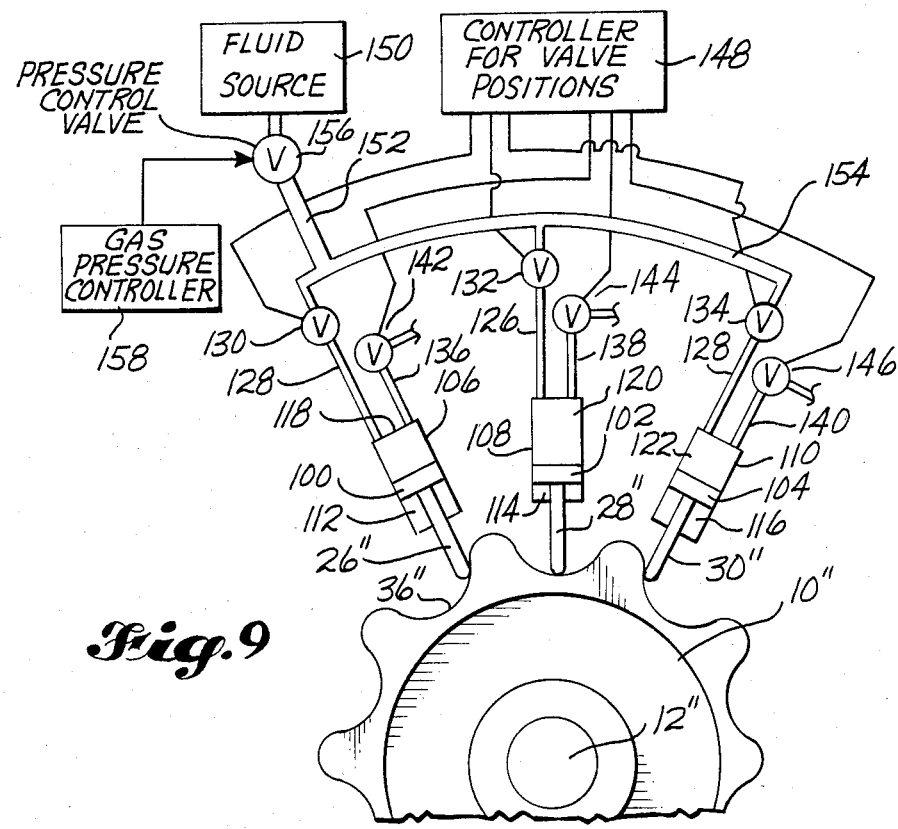
FIG. 9 is a view like FIG. 8, but of an embodiment which includes fluid motor type actuators, and showing a block diagram control circuit.

FIG. 9 shows a system comprising a cam wheel of the type shown by FIGS. 1-5 in combination with a fluid motor system for applying the driving torque. Each push rod 26", 28", 30" is connected to a piston portion 100, 102, 104 of a single acting fluid motor 106, 108, 110. Each motor 106, 108, 110 includes a chamber 112, 114, 116, positioned radially inwardly of its piston 100, 102, 104, which is vented to the atmosphere. Each also includes a chamber 118, 120, 122, positioned radially outwardly of its piston 100, 102, 104. Each chamber 118, 120, 122 includes an inlet passageway 124, 126, 128, each of which includes an off-on valve 130, 132, 134. Each chamber 118, 120, 122 also includes an exhaust passageway 136, 138, 140, each of which includes an off-on valve 142, 144, 146. A controller 148 is provided for opening and closing the valve 130, 132, 134, 142, 144, 146 in a programmed sequence which will drive the cam wheel 10" in the direction and to the extent desired.

More specifically, a fluid source, which may be a source of pressurized gas 150, is connected by a conduit 152 to a manifold 154. Manifold 154 delivers the fluid pressure to the conduits 124, 126, 128. A pressure control valve 156 is located in conduit 152 and is regulated by a gas pressure controller 158 which is a part of the control circuit.

In operation, the controller 148, which may include a microprocessor, opens and closes the off-on valves 130, 132, 134, 142, 144, 146 in a controlled sequence, for producing the driving pulses. The position of cam wheel 10" corresponds to the position of cam 10 in FIG. 3. Rotation of cam wheel 10" in the clockwise direction is accomplished by the controller 148 functioning to close exhaust valve 142 while opening exhaust valves 144, 146, and opening feed valve 130, while closing feed valves 132, 134. Fluid pressure is communicated through conduit 124 into the chamber 118, to exert a force on piston 100, driving it radially inwardly. Push rod 26" exerts a rotating force on the cam wheel 10", rotating it counterclockwise one step, until the drive rod 26" is in contact with the bottom of valley 36". Venting of chambers 120, 122, allows the push rods 28", 30" to move passively in response to the change in position of the cam surface.

The two controllers 92, 148 operate in a similar fashion. Each produces off-on signals which either control electrical solenoid type operators for the push rods (FIG. 8) or electrical solenoid controllers for valves in fluid conduits (FIG. 9). The specifics of the controllers are not a part of the present invention and hence they are shown in block diagram form.

If continuous stepping motion is required, and if it is required that the motor be able to change direction, at least three push rods are required. However, the invention is not limited to the use of but a single set of three push rods. Rather, in some installations, it may be desired to provide the motor with a plurality of sets of push rods which are spaced axially and/or circumferentially apart. For example, in the embodiment shown by FIGS. 1–5, a second set of three push rods may be positioned essentially diametrically opposite the set which is illustrated and described. In the embodiments shown by FIGS. 6 and 7, a plurality of sets of push rods may be spaced apart both axially of the rotor and circumferentially about the rotor.

However, in all installations, the proper angular spacing of the pistons is critical. To illustrate this requirement, irrespective of the shape of the teeth or cam on the rotor, if three push rods are used, the three push rods must be placed, relative to the undulating wave, at angular positions separated by 120 degrees. For example, in the embodiment illustrated by FIGS. 3–5, the angular positioning of the push rod 28 to push rod 26 and of push rod 30 to push rod 28 is 120 degrees, along the sine-like wave shaped cam surface.

It should be evident from what has been described that the change in position of a push rod on the cam by a fixed number of degrees during a drive step does not necessarily result in the same number of rotational degrees of the drive shaft. For example, in the embodiments shown by FIGS. 10–14, the first cam wheel 160 has eight complete lobes 162. As previously noted, for three push rods R1, R2, R3, the push rod motion is 120 degrees per step measured along the cam surface. The individual push rod, however, requires a total of three steps before it returns to its original cam angular position. This means that the shaft angular motion is determined as follows: three steps times eight lobes = twenty-four steps per 360 degrees = fifteen shaft rotational degrees per piston step. This shows that the number of shaft rotational degrees is a function of the number of lobes on the cam surface.

In the embodiment shown by FIG. 10, the rotors 160, 164, 166 and 168 are all connected to a common output shaft 170. As previously stated, rotor 160 has eight lobes. In this embodiment, rotor 164 is provided with sixteen lobes, rotor 166 is provided with thirty-two lobes and rotor 168 is provided with sixty-four lobes. The least amount of angular movement of the shaft 170 is controlled by the cam surface on rotor 168. When the driving push rod makes three steps, the least motion is: three times sixty-four = one hundred and ninety-two steps divided by 360 degrees = 1.875 shaft degrees per piston step. The number of cam lobes and push rods can be selected to give an even number of shaft degrees per piston step, if required. If larger steps are required, a combination of the cam wheels 160, 164, 166, 168 can provide them. For example, if each cam wheel moves one step, the total number of shaft rotational degrees is 360 degrees divided by three times eight plus 360 degrees divided by three times sixteen plus 360 degrees divided by three times thirty-two plus 360 degrees divided by three × sixty-four = fifteen degrees plus 7.5 degrees plus 3.83 degrees plus 1.75 degrees = 28.206 degrees. With proper selection, a combination of use of the cam rotors 160, 164, 166 and 168 will permit a high speed motor to be constructed with large or small intermediate steps to meet application needs.

There are additional design variations which can be derived from the instant disclosure. For example, a compound wheel can be constructed which comprises a plurality of cam wheels 172, 174, 176, each having the same number of cam lobes, but with their positions staggered circumferentially. This type of arrangement is shown in FIG. 15. In such an installation, each cam may be provided with a single set of three push rods. For example, cam 172 may be provided a set of push rods 178, 180, 182. Cam wheel 74 may be provided with a set of push rods 184, 186, 188. Cam wheel 176 may be provided with a set of push rods 190, 192, 194. In this embodiment, push rods 178, 184, 190 are shown to be aligned axially along the compound rotor. Push rods 180, 182, 192 are also axially aligned. Push rods, 182, 188, 194 are also axially aligned. Thus, using rotor 172 as a reference point, the compound rotor can be rotated a maximum amount by extending push rod 178 while removing any inward force on any of the other push rods 180, 182, 184, 186, 188, 190, 192, 194. At the end of the stroke, the push rods 178, 180, 182 would be repositioned relative to cam wheel 172 in the manner shown by FIG. 4. Push rod 178 would be in the bottom of a valley and would be in a position to apply a locking force on the compound rotor, preventing it from rotating in either direction. The push rods 180, 182 will be in the same position as push rods 28, 30 in FIG. 4 and either can be actuated to rotate the compound rotor a full step in one direction or the other, depending on which one is selected. However, the push rods 184, 186, 188 acting on cam wheel 174, and the push rods 190, 192, 194 acting on the cam wheel 196 will be positioned on their respective cam surfaces such that there is always a push rod positioned to, when actuated, rotate the compound rotor more than one step and another positioned to rotate the compound rotor less than one step.

A major advantage of the stepping motor concept of the present invention is that it can be used to construct a stepping motor in which the rotational speed can be very accurately controlled and very high drive torques can be produced.

It is to be understood that the invention is to be limited only to the appended claims.

I claim:
1. A digital command stepping motor, comprising:
a cam mounted for rotation about an axis, said cam having a circular peripheral portion presenting a radially outwardly directed, smoothly undulating cam surface, defined by alternating peak and valley regions;
a set of three linear actuators disposed radially outwardly from said cam surface, each said actuator comprising a radially extending push rod having an end portion in contact with said cam surface, means for forcibly driving its push rod endwise against said cam surface, and means for removing the drive force from its push rod; and
said actuators being spaced relative to said cam surface such that when the push rod of any one actuator is fully extended and in contact with the bottom of a valley region, the push rod of the second actuator is in a partially extended position against a sloping surface between a peak and a valley, and the push rod of the third actuator is in a partially extended position against an oppositely sloping surface between a peak and a valley, so that the cam wheel can be rotated in position in either direction, by operating the actuators to drive the push rod which is in contact with the sloping surface which trails the direction of desired rotation while removing any radially inwardly directed force on the push rods of the other two actuators.

2. A digital command stepping motor according to claim 1, comprising a drive shaft on which said cam is mounted, for rotation about said axis of rotation, and wherein the push rods of all three linear actuators are located within the center plane of the cam.

3. A digital command stepping motor according to claim 2, further comprising a housing for the cam having sidewalls which are contiguous opposite sides of the cam.

4. A digital command stepping motor according to claim 1, wherein the linear actuators are spaced apart both axially and circumferentially.

5. A digital command stepping motor according to claim 4, wherein the peaks and valleys of the cam surface follow helical paths as they extend axially of the cam.

6. A digital command stepping motor according to claim 5, wherein the three actuators are axiallly aligned relative to the cam.

7. A digital command stepping motor according to claim 1, wherein the peaks and valleys of the cam surface follow helical paths as they extend axially of the cam.

8. A digital command stepping motor according to claim 1, wherein the cam comprises a plurality of axially spaced apart sections, each having a radially outwardly directed undulating cam surface of the character described, and each said cam surface having a set of three actuators associated with it in the manner described.

9. A digital command stepping motor according to claim 8, wherein each section of the cam has a cam surface which is like the cam surface of the other sections of the cam wheel, except that the positions of the peaks and valleys relative to a common axial reference plane differ from section-to-section.

10. A digital command stepping motor according to claim 8, wherein each axial section of the cam has a different number of peaks and valleys.

11. A digital command stepping motor according to claim 1, wherein each actuator comprises an electrical solenoid which is operable to drive its push rod endwise against the cam surface.

12. A digital command stepping motor according to claim 11, comprising lock means for locking each push rod in position when the push rod is fully extended and in contact with the bottom of a valley region.

13. A digital command stepping motor according to claim 12, wherein each push rod includes a side notch, and the lock means comprises a locking pin element movable laterally of the push rod into and out from said notch.

14. A digital command stepping motor according to claim 13, comprising solenoid means for moving the locking pin into and out of engagement with the notch in the push rod.

15. A digital command stepping motor, comprising:
a cam mounted for movement, said cam having a smoothly undulating cam surface, defined by alternating peak and valley regions;
a set of three linear actuators disposed outwardly from said cam surface, each said actuator comprisng a push rod having an end portion in contact with said cam surface, means for forcibly driving its push rod endwise against said cam surface, and means for removing the drive force from its push rod; and
said actuators being spaced relative to said cam surface such that when the push rod of any one actuator is fully extended and in contact with the bottom of a valley region, the push rod of the second actuator is in a partially extended position against a sloping surface between a peak and a valley, and the push rod of the third actuator is in a partially extended position against an oppositely sloping surface between a peak and a valley, so that the cam can be moved in position in either direction, by operating the actuators to drive the push rod which is in contact with the sloping surface which trails the direction of desired travel while removing any inwardly directed force on the push rods ofthe other two actuators.

16. A digital command stepping motor according to claim 15, wherein each actuator comprises an electrical solenoid which is operable to drive its push rod endwise against the cam surface.

17. A digital command stepping motor according to claim 16, comprising lock means for locking each push rod in position when the push rod is fully extended and in contact with the bottom of a valley region.

18. A digital command stepping motor according to claim 17, wherein each push rod includes a side notch, and the lock means comprises a locking pin element movable laterally of the push rod into and out from said notch.

19. A digital command stepping motor according to claim 18, comprising solenoid means for moving the locking pin into and out of engagement with the notch in the push rod.

* * * * *